US011204092B2

United States Patent
Okahara et al.

(10) Patent No.: US 11,204,092 B2
(45) Date of Patent: Dec. 21, 2021

(54) CONTROL DEVICE FOR AUTOMATIC TRANSMISSION

(71) Applicant: JATCO LTD, Fuji (JP)

(72) Inventors: Ken Okahara, Fuji (JP); Hiroyasu Tanaka, Fuji (JP)

(73) Assignee: Jatco Ltd., Fuji (JP)

( * ) Notice: Subject to any disclaimer, the term of this patent is extended or adjusted under 35 U.S.C. 154(b) by 671 days.

(21) Appl. No.: 16/082,597

(22) PCT Filed: Feb. 17, 2017

(86) PCT No.: PCT/JP2017/005798
§ 371 (c)(1),
(2) Date: Sep. 6, 2018

(87) PCT Pub. No.: WO2017/159203
PCT Pub. Date: Sep. 21, 2017

(65) Prior Publication Data
US 2019/0063593 A1      Feb. 28, 2019

(30) Foreign Application Priority Data

Mar. 17, 2016  (JP) .............................. JP2016-053191

(51) Int. Cl.
*F16H 59/06*    (2006.01)
*F16H 61/14*    (2006.01)
(Continued)

(52) U.S. Cl.
CPC ............. *F16H 59/06* (2013.01); *B60W 10/02* (2013.01); *B60W 10/023* (2013.01);
(Continued)

(58) Field of Classification Search
CPC .......... F16H 59/06; F16H 59/18; F16H 59/36; F16H 59/38; F16H 59/70; F16H 61/04;
(Continued)

(56) References Cited

U.S. PATENT DOCUMENTS 4,582,185 A * 4/1986 Grimes ................... F16H 45/02
                                                           192/3.3
5,599,254 A * 2/1997 Tomisawa ............... F16H 61/12
                                                           192/3.3
(Continued)

FOREIGN PATENT DOCUMENTS

JP        2010-106700 A       4/2002

*Primary Examiner* — Tinh Dang
(74) *Attorney, Agent, or Firm* — Global IP Counselors, LLP

(57) ABSTRACT

A control device for an automatic transmission includes a continuously variable transmission mechanism, a torque converter, a target transmission ratio calculation unit, a feedback control unit, and a phase compensation unit. The torque converter has a lock-up clutch. The target transmission ratio calculation unit is configured to calculate a target transmission ratio based on a travelling state. The feedback control unit is configured to perform feedback control based on an actual value indicative of a state of the continuously variable transmission mechanism. The phase compensation unit is configured to perform phase lead compensation of the feedback control based on the travelling state. The phase compensation control unit is configured to halt the phase lead compensation when an unstable travelling state of a vehicle is detected. The phase compensation control unit is further configured to release the lock-up clutch when the phase lead compensation is halted.

5 Claims, 1 Drawing Sheet

(51) Int. Cl.
*B60W 30/188* (2012.01)
*F16H 59/18* (2006.01)
*F16H 59/38* (2006.01)
*F16H 59/70* (2006.01)
*F16H 61/04* (2006.01)
*F16H 61/66* (2006.01)
*F16H 63/46* (2006.01)
*F16H 59/36* (2006.01)
*F16H 61/662* (2006.01)
*B60W 10/02* (2006.01)
*F16H 61/00* (2006.01)
*B60W 50/00* (2006.01)
*G07C 5/08* (2006.01)
*F16H 61/16* (2006.01)
*F16H 59/02* (2006.01)

(52) U.S. Cl.
CPC ........ *B60W 10/024* (2020.02); *B60W 10/026* (2013.01); *B60W 10/0235* (2020.02); *B60W 30/1884* (2013.01); *F16H 59/18* (2013.01); *F16H 59/36* (2013.01); *F16H 59/38* (2013.01); *F16H 59/70* (2013.01); *F16H 61/04* (2013.01); *F16H 61/14* (2013.01); *F16H 61/66* (2013.01); *F16H 61/662* (2013.01); *F16H 61/66259* (2013.01); *F16H 63/46* (2013.01); *B60W 2050/0008* (2013.01); *F16H 2059/0256* (2013.01); *F16H 2061/0075* (2013.01); *F16H 2061/166* (2013.01); *G07C 5/0816* (2013.01)

(58) Field of Classification Search
CPC .. F16H 61/66; F16H 61/662; F16H 61/66259; F16H 63/46; B60W 10/026; B60W 10/02; B60W 10/023; B60W 10/0235; B60W 10/024; B60W 10/10; B60W 30/1884; B60W 2050/0008; G07C 5/0816; Y10T 477/6347; Y10T 477/635; Y10T 477/79
See application file for complete search history.

(56) References Cited

U.S. PATENT DOCUMENTS

| | | | | |
|---|---|---|---|---|
| 5,653,661 | A * | 8/1997 | Kato | F16H 61/143 477/169 |
| 5,733,223 | A * | 3/1998 | Matsubara | B60W 10/04 477/175 |
| 5,853,350 | A * | 12/1998 | Hasegawa | F16H 61/143 477/166 |
| 6,066,072 | A * | 5/2000 | Adachi | F16H 61/143 477/176 |
| 6,334,835 | B1 * | 1/2002 | Tanaka | F02D 41/126 477/187 |
| 7,282,009 | B2 * | 10/2007 | Sekiya | F16H 61/143 477/169 |
| 7,361,120 | B2 * | 4/2008 | Iida | F16H 61/143 192/3.3 |
| 7,674,204 | B2 * | 3/2010 | Turpin | B60W 10/10 477/181 |
| 7,769,517 | B2 * | 8/2010 | Segawa | F16H 61/143 701/68 |
| 7,769,518 | B2 * | 8/2010 | Segawa | F16H 61/143 701/68 |
| 8,210,988 | B2 * | 7/2012 | Iraha | F16H 61/143 477/65 |
| 2004/0162184 | A1 * | 8/2004 | Segawa | F16H 61/143 477/62 |
| 2006/0063641 | A1 * | 3/2006 | Oshita | F16H 61/12 477/44 |

* cited by examiner

CONTROL DEVICE FOR AUTOMATIC TRANSMISSION

CROSS-REFERENCE TO RELATED APPLICATIONS

This is a U.S. national phase application of PCT/JP2017/005798, filed on Feb. 17, 2017, which claims priority to Japanese Patent Application No. 2016-053191, filed on Mar. 17, 2016. The entire disclosure of Japanese Patent Application No. 2016-053191 is hereby incorporated herein by reference.

TECHNICAL FIELD

The present invention relates to a control device for an automatic transmission comprising a continuously variable transmission mechanism mounted in a vehicle.

BACKGROUND ART

Disclosed in Patent Document 1 is a conventional technique for performing shift control in which phase lead compensation is performed when controlling so as to become a target transmission ratio.

However, for the phase lead amount when performing phase lead compensation, the optimal value differs according to the travelling state, so depending on the travelling state, there is a risk that suitable phase lead compensation may not be performed, causing a feeling of discomfort to the driver.

PRIOR ART DOCUMENTS

Patent Documents

[Patent Document 1] Japanese Unexamined Patent Publication No. 2002-106700

SUMMARY OF THE INVENTION

The present invention was created with a focus on the abovementioned problem, and its purpose is to provide a control device of an automatic transmission that can suppress a feeling of discomfort given to the driver regardless of the travelling state. To address the abovementioned problem, the control device of an automatic transmission of the present invention comprises: a continuously variable transmission mechanism, a target transmission ratio calculation unit for calculating a target transmission ratio based on the travelling state, a feedback control unit for doing feedback control based on an actual value showing the state of the continuously variable transmission mechanism, a phase compensation unit for performing phase lead compensation of the feedback control based on the travelling state, and a phase compensation control unit for halting the phase lead compensation by the phase compensation unit when an unstable travelling state of a vehicle is detected.

Thus, because the phase lead compensation is halted when an unstable state of a vehicle is detected, it is possible to suppress a feeling of discomfort given to the driver.

MODES FOR CARRYING OUT THE INVENTION

Embodiment 1

Figure 1:
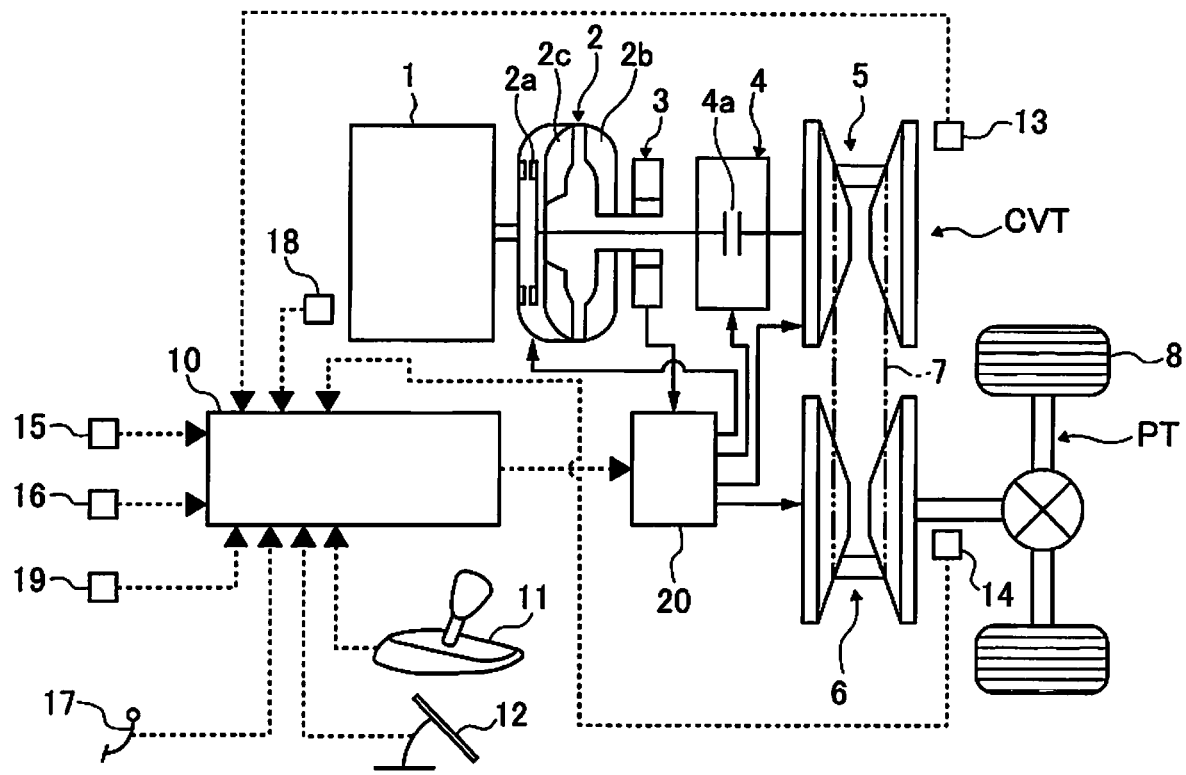
FIG. 1 is a system diagram showing a control device of a continuously variable transmission of embodiment 1.

FIG. 1 is a system diagram showing a control device of an automatic transmission of embodiment 1. The vehicle of embodiment 1 has an engine 1 that is an internal combustion engine, and an automatic transmission, and transmits driving force to tires 8 which are drive wheels via a differential gear. The power transmission path connecting from the automatic transmission to the tires 8 is collectively noted as a power train PT.

The automatic transmission has a torque converter 2, an oil pump 3, a forward-reverse switching mechanism 4, and a continuously variable transmission mechanism (belt-type continuously variable transmission mechanism) CVT. The torque converter 2 has: a pump impeller 2b connected to the engine 1 that rotates integrally with a driving pawl for driving the oil pump 3; a turbine runner 2c connected with the input side of the forward-reverse switching mechanism 4 (input shaft of the continuously variable transmission mechanism CVT); and a lock-up clutch 2a that can integrally connect the pump impeller 2b and the turbine runner 2c. The forward-reverse switching mechanism 4 is configured from a planetary gear mechanism and a plurality of clutches 4a, and switches between forward and reverse by the engagement state of the clutches 4a. The continuously variable transmission mechanism CVT has: a primary pulley 5 connected with the output side of the forward-reverse switching mechanism 4 (input shaft of the continuously variable transmission), a secondary pulley 6 that rotates integrally with the drive wheels, a belt 7 that is wound between the primary pulley 5 and the secondary pulley 6 and performs power transmission, and a control valve unit 20 that supplies control pressure to each hydraulic actuator.

The control unit 10 reads: range position signals from a shift lever 11 for selecting a range position by an operation by the driver (hereafter, the range position signals are respectively noted as P range, R range, N range, and D range); accelerator pedal opening signals from the accelerator pedal opening sensor 12 (hereafter called APO); brake pedal on and off signals from a brake switch 17; primary pulley pressure signals from a primary pulley pressure sensor 15 for detecting oil pressure of the primary pulley 5; secondary pulley pressure signals from a secondary pulley pressure sensor 16 for detecting oil pressure of the secondary pulley 6; primary speed signals Npri from a primary pulley speed sensor 13 for detecting rotational speed of the primary pulley 5; secondary speed signals Nsec from a secondary pulley speed sensor 14 for detecting rotational speed of the secondary pulley 6; engine speed signals Ne from an engine speed sensor 18 for detecting engine speed; and acceleration signals G from a G sensor 19 for detecting forward-reverse acceleration of a vehicle. When in the D range, the primary speed signals Npri are also noted as turbine speed Nt hereafter because they match the turbine speed by engagement of the clutch 4a.

The control unit 10 controls the engagement state of the clutch 4a according to the range position signal. In specific terms, if in the P range or the N range, the clutch 4a is in a released state, and if in the R range, a control signal is output to a control valve unit 20 to have the forward-reverse switching mechanism 4 output reverse rotation, and the reverse clutch (or brake) is engaged. Also, if in the D range, a control signal is output to the control valve unit 20 so that the forward-reverse switching mechanism 4 is integrally rotated to output forward rotation, and the clutch 4a is engaged. Also, the vehicle speed VSP is calculated based on the secondary rotational speed.

Figure 2:
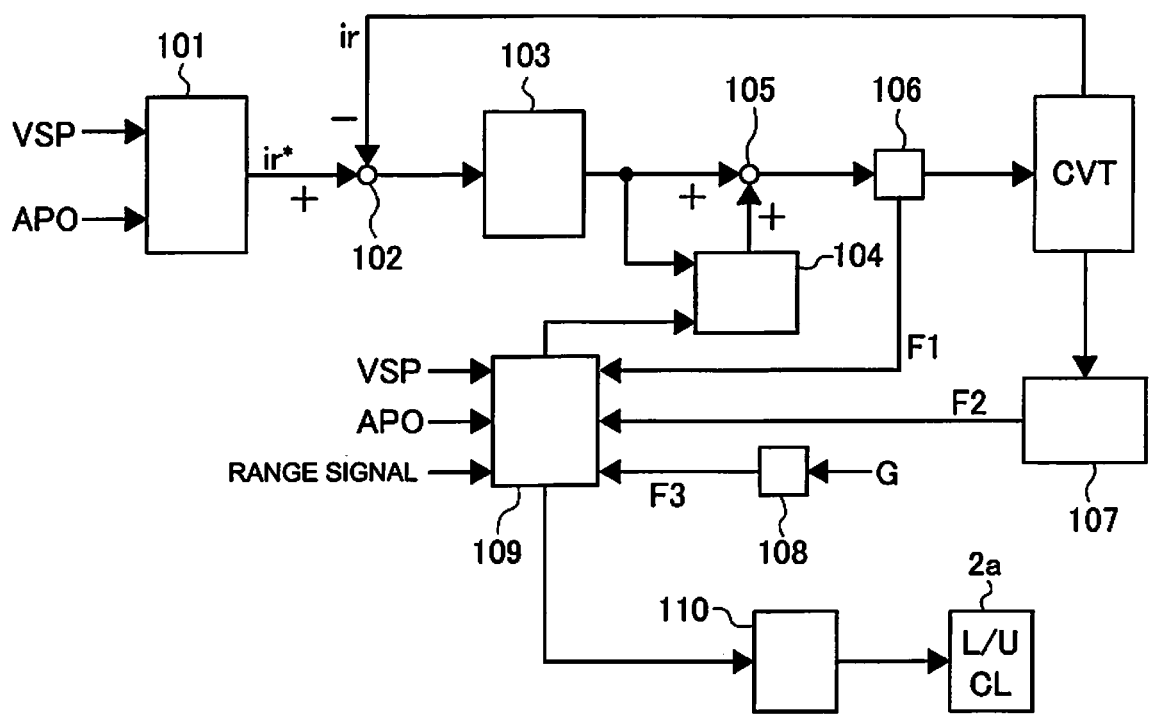
FIG. 2 is a control block diagram showing an overview of the inside of the control unit of embodiment 1.

FIG. 2 is a block diagram showing the control configuration inside the control unit 10 of embodiment 1. The control unit 10 has: a target transmission ratio calculation unit 101, a deviation calculation unit 102, a feedback control unit 103, a phase compensation unit 104, an adder 105, a command signal divergence detection unit 106, an oil vibration detection unit 107, a vehicle vibration detection unit 108, a phase compensation control unit 109, and a lock-up control unit 110 for controlling the engagement state of the lock-up clutch 2a.

With the target transmission ratio calculation unit 101, a target transmission ratio ir* is calculated from a shift map by which an optimal fuel efficiency state can be achieved based on the APO signal and the vehicle speed VSP. With the deviation calculation unit 102, an actual transmission ratio ir is detected based on primary speed signals Npri and secondary speed signal Nsec which are actual values showing the state of the continuously variable transmission mechanism CVT, and the deviation between the actual transmission ratio ir and the target transmission ratio ir* is calculated. With the feedback control unit 103, a feedback command signal is calculated for the solenoid that controls the pulley oil pressure so that the set target transmission ratio ir* matches the actual transmission ratio ir which is the actual value showing the state of the continuously variable transmission mechanism CVT.

With the phase compensation unit 104, a phase lead amount α is calculated according to the travelling state for the command signal calculated by the feedback control unit 103, and a phase compensation signal is calculated based on the phase lead amount α. With the adder 105, the phase compensation signal is added to the feedback command signal and the final command signal is calculated. With the command signal divergence detection unit 106, detection is done of whether or not the final command signal is divergent, and when not divergent, the divergence flag F1 is OFF, and when it is divergent, the divergence flag F1 is ON. Here, the command signal divergence is detected based on whether or not the frequency is a designated value or greater, and whether the state of the amplitude being a designated value or greater has continued for a designated time.

With the oil vibration detection unit 107, first, the voltage signal detected by the primary pulley pressure sensor 15 and the secondary pulley pressure sensor 16 are converted to an oil pressure signal, the DC component (fluctuation component according to the control command) is removed by band pass filter processing, and only the vibration component is extracted. Then, the amplitude of the vibration component is calculated, and when a state for which the amplitude of either the primary pulley pressure or the secondary pulley pressure is a designated amplitude or greater has continued for a designated time or longer, the oil vibration flag F2 is ON. On the other hand, when the oil vibration flag F2 is in an ON state, if the state of the amplitude being less than a designated amplitude continues for a designated time or longer, the oil vibration flag F2 is OFF.

With the vehicle vibration detection unit 108, the vibration component of the forward-reverse acceleration detected by the G sensor 19 is extracted, and when a state of the amplitude of the vibration component being at a designated value or higher continues for a designated time or longer, the vibration flag F3 is ON. On the other hand, when a state with the amplitude of the vibration component at less than a designated level continues for a designated time or longer, the vibration flag F3 is OFF.

With the phase compensation control unit 109, the information of the divergence flag F1, the oil vibration flag F2, and the vibration flag F3 as well as the range position signal is read, and the operating point stipulated by the VSP and APO is calculated. Then, after the engine starts, when all of the various types of flags are OFF, a signal is output that allows outputting of the phase compensation signal at the phase compensation unit 104. On the other hand, when any one of the flags is ON, a signal is output that prohibits outputting of the phase compensation signal at the phase compensation unit 104, and a command is output to release the lock-up clutch 2a.

Specifically, when any of the divergence flag F1, the oil vibration flag F2, and the vibration flag F3 is ON, by the phase compensation signal being outputted from the phase compensation unit 104, in fact, there is a risk of the vibration of the command signal becoming larger, and a risk of the vibration being amplified. Thus, by prohibiting outputting of the phase compensation signal, only feedback control is made to function. As a result, it is possible to obtain a highly robust control configuration. Also, by releasing the lock-up clutch 2a, the mass of the power train PT can be changed to a mass with the engine mass removed from the mass for which engine mass was added. The resonance frequency has a correlation with the mass of the power train PT, so is it possible to move the resonance frequency by changing the mass, and possible to suppress vibration.

Also, with the phase compensation control unit 109, even after prohibition of outputting of the phase compensation signal from the phase compensation unit 104, when the divergence flag F1 or the oil vibration flag F2 turns ON and prohibition occurs, after that, when all the flags are OFF, by the restoration conditions noted hereafter being established, outputting of the phase compensation signal from the phase compensation unit 104 starts again, and engagement of the lock-up clutch 2a is allowed.

(Restoration condition 1) When the operating point is moved (Restoration condition 2) When the range position signal is changed All the flags are reset to OFF when the ignition switch goes off, so the next time the ignition switch turns on, the lock-up clutch 2a engagement and phase compensation signal output are executed according to normal control.

Specifically, the lock-up clutch 2a has the role of directly connecting the power transmission path between the engine 1 and the automatic transmission, and contributes to improvement of the fuel efficiency. Thus, with the lock-up clutch 2a left released, there is a risk of not being able to improve the fuel efficiency sufficiently. A vibration phenomenon such as resonance, etc., is a phenomenon that occurs depending on the operating point determined by the VSP and the APO, and when the operating point moves from the vibration occurrence time operating point to another operating point, it is possible to avoid vibration at the vibration occurrence time operating point. Thus, when the operating point is changed, outputting of the phase compensation signal is started again, and re-engagement of the lock-up clutch 2a is allowed. Also, when changed from the D range to the N range, etc., because the state of the power train PT is changed, there is a high possibility of being able to avoid the vibration phenomenon. In light of that, when the range position signal is changed, outputting of the phase compensation signal is started again, and re-engagement of the lock-up clutch 2a is allowed. As a result, it is easier to ensure the phase compensation and the engagement state of the lock-up clutch 2a during travel, and possible to improve the fuel efficiency while ensuring controllability.

On the other hand, when the vibration flag F3 is ON, for example even when all of the flags are OFF, outputting of the phase compensation signal is prohibited until the ignition switch turns off, and engagement of the lock-up clutch 2a is prohibited. Specifically, in a state for which the divergence flag F1 or the oil vibration flag F2 are ON, these phenomena do not necessarily appear in the vehicle behavior. Outputting of the phase compensation signal is prohibited before appearing in the vehicle behavior, and if the divergence flag F1 or the oil vibration flag F2 are OFF, outputting of the phase compensation signal is started again, or even if an opportunity is given for engagement of the lock-up clutch 2a, there is little effect on the vehicle behavior. However, when the vibration flag F3 is ON, there is a state for which vibration occurs in the actual vehicle behavior, and outputting of the phase compensation signal starts again, or when engagement of the lock-up clutch 2a is allowed, by vibration occurring in the actual vehicle behavior, it is easier for a feeling of discomfort to be given to the driver. In light of that, when the vibration flag F3 is ON, for example, after that, even if the vibration flag F3 is switched to OFF, engagement of the lock-up clutch 2a is prohibited.

As explained above, the operational effects listed hereafter can be obtained with the embodiment.

(1) Provided are a continuously variable transmission mechanism CVT for which the belt 7 is wound between the primary pulley 5 and the secondary pulley 6, for controlling the belt gripping pressure in the primary pulley 5 and the secondary pulley 6 for shifting, the target transmission ratio calculation unit 101 for calculating a target transmission ratio ir* based on the travelling state, the feedback control unit 103 for doing feedback control based on an actual value showing the state of the continuously variable transmission mechanism CVT, the phase compensation unit 104 for performing phase lead compensation of the feedback control based on the travelling state, and the phase compensation control unit 109 for halting the phase lead compensation by the phase compensation unit 104 when an unstable travelling state of a vehicle is detected. Thus, it is possible to stabilize control, and to stabilize vehicle behavior.

(2) Provided is a torque converter 2 having a lock-up clutch 2a, provided between an engine 1 (power source) and the continuously variable transmission mechanism CVT, wherein when the lock-up clutch 2a is engaged and the phase lead compensation is halted, the phase compensation control unit 109 releases the lock-up clutch 2a. Thus, by changing the mass of the power train PT, it is possible to change the resonance frequency and suppress vibration. Also, even when the vehicle forward-reverse acceleration vibrates, by releasing the lock-up clutch 2a, it is possible to connect the engine 1 and the automatic transmission via fluid, and possible to suppress vibration with the drive wheels.

(3) After halting the phase lead compensation, when the operating point set based on the vehicle speed VSP and accelerator pedal opening APO value is changed, the phase compensation control unit 109 restores the phase lead compensation. Specifically, if the operating point changes, there is a high possibility of exiting from the travelling state for which vibration occurs, so it is possible to output phase compensation signals in a larger number of travelling states.

(4) After halting the phase lead compensation, when the range position of a select lever operated by the driver is changed, the phase compensation control unit 109 restores the phase lead compensation. Specifically, if the range position changes, there is a high possibility of exiting from the travelling state for which vibration occurs, so it is possible to output phase compensation signals in a larger number of travelling states.

(5) The phase compensation control unit 109 changes the restoration conditions of the phase lead compensation according to an unstable travelling state of a vehicle when the phase lead compensation is halted. Specifically, even when there is judged to be an unstable travelling state of a vehicle, restoration is limited to when there is actually an unstable state as vehicle behavior, and by promoting restoration when there is an unstable state in terms of control, but not reflected in actual vehicle behavior, it is possible to ensure a travelling state for which phase lead compensation is possible while avoiding an unstable state.

(6) With the phase compensation control unit 109, for the engagement timing for which after release of the lock-up clutch 2a, the lock-up clutch 2a is engaged based on the phase lead compensation restoration conditions, the engagement timing in a case of a travelling state for which command signal divergence for the feedback control unit or oil vibration is detected as the unstable travelling state of the vehicle when the phase lead compensation is halted, is earlier than the engagement timing in a case of a travelling state of the forward-reverse acceleration of the vehicle vibrating as the unstable travelling state of the vehicle when the phase lead compensation is halted. In specific terms, when the vibration flag F3 is ON, and thereafter turns OFF, by prohibiting engagement of the lock-up clutch 2a until the next time the ignition switch turns off, an actual effect on vehicle behavior is avoided. On the other hand, when the divergence flag F1 or the oil vibration flag F2 turn ON, and turn OFF thereafter, with the condition that the operating point or the range position changes, engagement of the lock-up clutch 2a is permitted. Specifically, if in a state for which vibration does not absolutely appear in the vehicle behavior, if the divergence flag F1 or the oil vibration flag F2 turn OFF, even if an opportunity to engage the lock-up clutch 2a is given again, there is little effect on the vehicle behavior. Thus, it is possible to improve fuel efficiency by making it easy to ensure an engaged state of the lock-up clutch 2a while suppressing the effect on the vehicle behavior.

The invention claimed is:

1. A control device for an automatic transmission, comprising:
   a continuously variable transmission mechanism;
   a torque converter arranged between a power source and the continuously variable transmission mechanism, the torque converter having a lock-up clutch; and
   a control unit including
      a target transmission ratio calculation unit configured to calculate a target transmission ratio based on a travelling state,
      a feedback control unit configured to perform feedback control based on an actual value indicative of a state of the continuously variable transmission mechanism,
      a phase compensation unit configured to perform phase lead compensation of the feedback control based on the travelling state, and
      a phase compensation control unit configured to halt the phase lead compensation by the phase compensation unit when an unstable travelling state of a vehicle is detected, the phase compensation control unit being further configured to release the lock-up clutch when the lock-up clutch is engaged and the phase lead compensation is halted.

2. The control device for an automatic transmission according to claim 1, wherein
after halting the phase lead compensation, when an operating point set based on a vehicle speed and an accelerator pedal opening value is changed, the phase compensation control unit, of the control unit, is configured to restore the phase lead compensation.

3. The control device for an automatic transmission according to claim 1, wherein
after halting the phase lead compensation, when a range position of a select lever operated by a driver is changed, the phase compensation control unit, of the control unit, is configured to restore the phase lead compensation.

4. The control device for an automatic transmission according to claim 1, wherein
the phase compensation control unit, of the control unit, is configured to change restoration conditions of the phase lead compensation according to the unstable travelling state of the vehicle when the phase lead compensation is halted.

5. The control device for an automatic transmission according to claim 1, wherein
the phase compensation control unit, of the control unit, is configured to control an engagement timing at which the lock-up clutch is engaged after release of the lock-up clutch based on phase lead compensation restoration conditions, such that the engagement timing in a case of the travelling state for which command signal divergence for the feedback control unit, of the control unit, or oil vibration is detected as the unstable travelling state of the vehicle when the phase lead compensation is halted, is earlier than the engagement timing in a case of the travelling state of a forward-reverse acceleration of the vehicle vibrating as the unstable travelling state of the vehicle when the phase lead compensation is halted.

* * * * *